(12) United States Patent
Steckhan et al.

(10) Patent No.: US 9,253,449 B2
(45) Date of Patent: Feb. 2, 2016

(54) MOSAIC PICTURE GENERATION

(71) Applicant: Fraunhofer-Gesellschaft zur Foerderung der angewandten Forschung e.V., Munich (DE)

(72) Inventors: Dirk Steckhan, Munich (DE); Thorsten Zerfass, Nuremberg (DE); Thomas Wittenberg, Erlangen (DE); Matthias Elter, Erlangen (DE); Dietrich Paulus, Koblenz (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 294 days.

(21) Appl. No.: 13/772,678

(22) Filed: Feb. 21, 2013

(65) Prior Publication Data

US 2013/0162803 A1  Jun. 27, 2013

Related U.S. Application Data

(63) Continuation of application No. PCT/EP2011/064376, filed on Aug. 22, 2011.

(30) Foreign Application Priority Data

Aug. 23, 2010  (DE) .......................... 10 2010 039 652

(51) Int. Cl.
*H04N 7/18* (2006.01)
*G02B 21/36* (2006.01)
(Continued)

(52) U.S. Cl.
CPC ................. *H04N 7/18* (2013.01); *G02B 21/367* (2013.01); *G06T 3/4038* (2013.01); *G06T 7/0034* (2013.01); *G06T 2200/32* (2013.01); *G06T 2207/10016* (2013.01)

(58) Field of Classification Search
CPC .. G02B 21/367; G02B 21/365; G02B 21/002; G06T 2200/32; G06T 2207/10016; G06T 3/4038; G06T 7/0034; H04N 7/18; G01N 21/6458
USPC ........................................................... 348/79
See application file for complete search history.

(56) References Cited

U.S. PATENT DOCUMENTS 6,956,657 B2   10/2005  Golini et al.
6,987,274 B1 *  1/2006  Street et al. ................ 250/458.1
(Continued)

FOREIGN PATENT DOCUMENTS

WO       98/39728 A1    9/1998
WO    2006/023443 A2    3/2006

OTHER PUBLICATIONS

Steckhan et al, "Efficient large scale Image Stitching for Virtual Microscope", Aug. 2008.*
(Continued)

*Primary Examiner* — Shan Elahi
(74) *Attorney, Agent, or Firm* — Keating & Bennett, LLP

(57) ABSTRACT

A stability and, thus, also a quality of mosaic generation is improved by exploiting the advantages of global optimization while giving up performing the optimization fully on the basis of mutual alignment of the image information alone, i.e. on the basis of the result of a search for similarities, but when, additionally, information about error statistics of the capturing device, which took over portion-by-portion capturing of the object plane, is instead also taken into account in the positioning of the subimages in that a secondary constraint (secondary constraint) is set up for the capturing position variables in the optimization problem.

14 Claims, 8 Drawing Sheets

(51) Int. Cl.
*G06T 3/40* (2006.01)
*G06T 7/00* (2006.01)

(56) References Cited

U.S. PATENT DOCUMENTS

| | | | |
|---|---|---|---|
| 7,565,028 B2* | 7/2009 | Saed | 382/284 |
| 8,497,916 B2* | 7/2013 | Ogura | 348/208.6 |
| 2005/0100319 A1* | 5/2005 | Saed | 386/69 |
| 2006/0045388 A1* | 3/2006 | Zeineh et al. | 382/312 |
| 2008/0187208 A1 | 8/2008 | Shirota | |
| 2009/0074284 A1* | 3/2009 | Zeineh et al. | 382/133 |
| 2010/0149363 A1* | 6/2010 | Inomata et al. | 348/222.1 |
| 2010/0188743 A1 | 7/2010 | Inoue | |

OTHER PUBLICATIONS

Official Communication issued in International Patent Application No. PCT/EP2011/064376, mailed on Nov. 21, 2011.
Steckhan et al., "Efficient Large Scale Image Stitiching for Virtual Microscopy," 30th Annual International IEEE EMBS Conference, Aug. 20-24, 2008, pp. 4019-4023.
Steckhan et al., "A Quadratic Programming Approach for the Mosaicing of Virtual Slides that Incorporates the Positioning Accuracy of the Microscope Stage," 32nd Annual International Conference of the IEEE EMBS, Aug. 31-Sep. 4, 2010, pp. 72-77.
http://en.wikipedia.org/wiki/Kalman_filter, Oct. 20, 2011.
Preibisch, S. et al., "Globally Optimal Stitching of Tiled 3D Microscopic Image Acquisitions", Bioinformatics, Applications Note, vol. 25, No. 11, 2009, pp. 1463-1465.
Leong, F. et al., "Automated Complete Slide Digitization: A Medium for Simultaneous Viewing by Multiple Pathologists", Journal of Pathology, vol. 195, No. 4, 2001, pp. 508-514.
Saeger, K. et al., "The Virtual Microscope for Routine Pathology Based on a PACS System for 6 Gb Images", International Congress Series, vol. 1256, 2003, pp. 299-304.
Szeliski, R., "Image Alignment and Stitching: A Tutorial", Foundations and Trends in Computer Graphics and Vision, vol. 2, No. 1, Now Publishers Inc, 2006, 105 pages.
Davis, J., "Mosaics of Scenes with Moving Objects", IEEE Computer Society Conference on Computer Vision and Pattern Recognition, Jun. 23-25, 1998, pp. 354-360.
Kang, E. et al., "A Graph-based Global Registration for 2D Mosaics", 15th International Conference on Pattern Recognition, vol. 1, 2000, pp. 257-260.
Sun, C. et al., "Mosaicing of Microscope Images", Digital Image Computing: Techniques and Applications, 2005, pp. 343-348.
Appleton, B. et al., "Towards Optimal Image Stitching for Virtual Microscopy", Digital Image Computing: Techniques and Applications, 2005, pp. 299-306.
Steckhan, D. et al., "Optimized Graph-based Mosaicking for Virtual Microscopy", Medical Imaging, Image Processing, vol. 7259, Jan. 2009, 8 pages.
Foroosh, H. et al., "Extension of Phase Correlation to Subpixel Registration", IEEE Transactions on Image Processing, vol. 11, No. 3, Mar. 2002, pp. 188-200.
Wald, D. et al., "Smooth Cross-fading in Endoscopy Images for Creating a Mosaic", 2005, pp. 287-291.
Kuhn, H. et al., "Nonlinear Programming", ACM SIGMAP Bulletin, 1982, pp. 481-492.

* cited by examiner

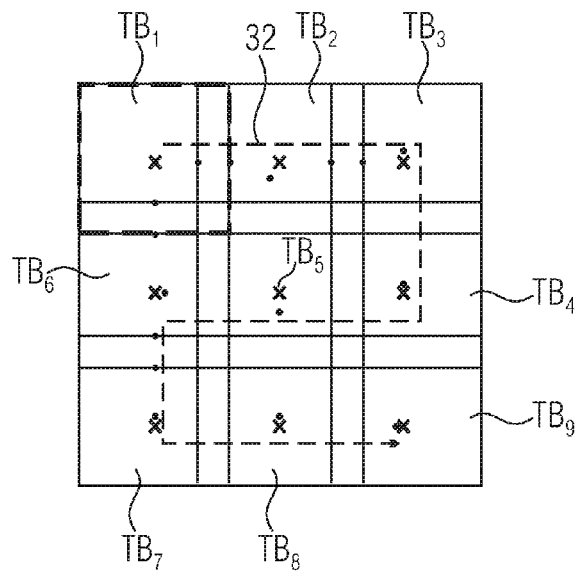
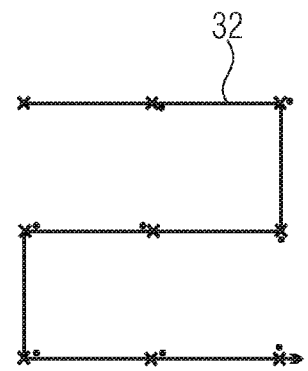
FIGURE 3A
FIGURE 3B
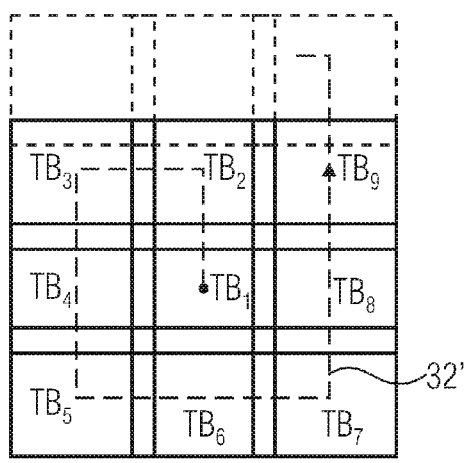
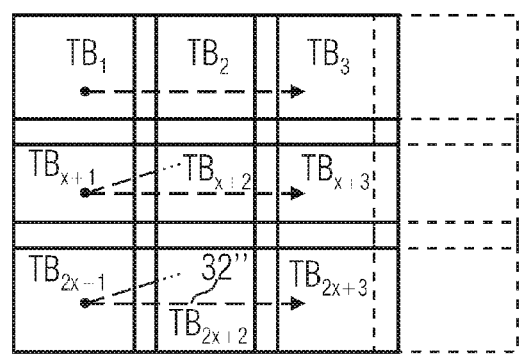
FIGURE 3C
FIGURE 3D $$A = \begin{pmatrix} -1 & 1 & 0 & 0 & 0 & 0 & 0 & 0 & 0 \\ -1 & 0 & 0 & 0 & 0 & 1 & 0 & 0 & 0 \\ 0 & -1 & 1 & 0 & 0 & 0 & 0 & 0 & 0 \\ 0 & -1 & 0 & 0 & 1 & 0 & 0 & 0 & 0 \\ 0 & 0 & -1 & 1 & 0 & 0 & 0 & 0 & 0 \\ 0 & 0 & 0 & -1 & 1 & 0 & 0 & 0 & 0 \\ 0 & 0 & 0 & -1 & 0 & 0 & 0 & 0 & 1 \\ 0 & 0 & 0 & 0 & -1 & 1 & 0 & 0 & 0 \\ 0 & 0 & 0 & 0 & -1 & 0 & 0 & 1 & 0 \\ 0 & 0 & 0 & 0 & 0 & -1 & 1 & 0 & 0 \\ 0 & 0 & 0 & 0 & 0 & 0 & -1 & 1 & 0 \\ 0 & 0 & 0 & 0 & 0 & 0 & 0 & -1 & 1 \end{pmatrix}$$

FIGURE 7A $$C = \begin{pmatrix} -1 & 1 & 0 & 0 & 0 & 0 & 0 & 0 & 0 \\ 1 & -1 & 0 & 0 & 0 & 0 & 0 & 0 & 0 \\ 0 & -1 & 1 & 0 & 0 & 0 & 0 & 0 & 0 \\ 0 & 1 & -1 & 0 & 0 & 0 & 0 & 0 & 0 \\ 0 & 0 & -1 & 1 & 0 & 0 & 0 & 0 & 0 \\ 0 & 0 & 1 & -1 & 0 & 0 & 0 & 0 & 0 \\ 0 & 0 & 0 & -1 & 1 & 0 & 0 & 0 & 0 \\ 0 & 0 & 0 & 1 & -1 & 0 & 0 & 0 & 0 \\ 0 & 0 & 0 & 0 & -1 & 1 & 0 & 0 & 0 \\ 0 & 0 & 0 & 0 & 1 & -1 & 0 & 0 & 0 \\ 0 & 0 & 0 & 0 & 0 & -1 & 1 & 0 & 0 \\ 0 & 0 & 0 & 0 & 0 & 1 & -1 & 0 & 0 \\ 0 & 0 & 0 & 0 & 0 & 0 & -1 & 1 & 0 \\ 0 & 0 & 0 & 0 & 0 & 0 & 1 & -1 & 0 \\ 0 & 0 & 0 & 0 & 0 & 0 & 0 & -1 & 1 \\ 0 & 0 & 0 & 0 & 0 & 0 & 0 & 1 & -1 \end{pmatrix}$$

FIGURE 7B

MOSAIC PICTURE GENERATION

CROSS-REFERENCE TO RELATED APPLICATIONS

This application is a continuation of copending International Application No. PCT/EP2011/064376, filed Aug. 22, 2011, which is incorporated herein by reference in its entirety, and additionally claims priority from German Application No. DE 102010039652.4, filed Aug. 23, 2010, which is also incorporated herein by reference in its entirety.

The present invention relates to generating a mosaic picture of an object plane, e.g. of the picture of a sample on a microscope slide.

BACKGROUND OF THE INVENTION

Conventional light microscopy is one of the most widely used and efficient techniques of examining and diagnosing biological samples. However, said techniques are limited by several factors. Stain colors may change or fade over time. This applies particularly to immunofluorescence staining techniques, which are frequently usable during a very short period of time only [14]. Biological samples tend to age. However, slides that are used are unique and cannot be reproduced, e.g. when the slide glass breaks. Unfortunately, microscopes visualize only a small part of a slide at any one time, and the magnifications are limited to the available objectives. Simultaneous viewing of a slide is limited to a very small number of persons, and the slide has to be physically present. In addition, it is not possible to annotate regions of interest on the slide.

One goal of virtual microscopy consists in solving said problems by replacing direct work with the microscope and the slide with utilization of digitized samples. To this end, the slide is scanned once by a fully automated robotic microscope and is digitally stored. Such digitized samples exhibit none of the above-mentioned problems. In addition, it is possible to examine such digitized samples from a distance from any computer as if the sample was physically present. Any regions of interest, for example cancerous cells, can be annotated on the slide, and consequently, it is still possible to understand at a later point in time why a certain examining person made a specific diagnosis. Consequently, in the long term, virtual microscopy may possibly replace traditional microscopy.

However, there are still problems that have not been entirely solved. One of said problems consists in the need to correctly register (align) any fields of view in biological samples with larger areas of no information content, such as samples from cytometry. A slide is simply too large to be detected with one image at a reasonable magnification. One may imagine, for example, the case of a 20-fold magnification and of a typical color camera producing a 1000×1000 pixel image and comprising a cell size of 7.4 µm×7.4 µm. This would mean that each pixel covered an area of 0.37 µm×0.37 µm, and that each field of view had an area of 0.37 mm×0.37 mm. Of course, this depends on the type of sample being scanned, but to simply give an example, the valid area to be scanned may be 2 cm×3 cm, for example, which would mean that about 55×82=4510 fields of view would have to be detected. The scanning operation of the slide to be virtualized is typically performed by computer-controlled, motorized positioning tables (stages) which, additionally, may be accurately calibrated. However, irrespective of the degree of precision of their calibration, positioning tables will invariably have positioning errors which may accumulate, in turn, during the scanning operation and may consequently result in alignment errors in the virtual image of the slide. As a result, a great challenge in virtual microscopy is to develop algorithms which mutually align any detected fields of view in such a manner that the originally scanned slide is fully reconstructed.

The conventional approach to stitching fields of view in the manner of a mosaic (mosaicing) consists in scanning the slide in a first step and, in a second step, to align each field of view with its neighboring fields of view, which is sometimes followed by an optimization step. In a naïve approach, the fields of view are simply mutually aligned one after the other in the sequence in which they have been detected. It is better to take into account the mosaic by optimization while considering the interaction effects between the change in the relative locations of two fields of view on the matching of the other field-of-view pictures.

In other words, in virtual microscopy there is the problem of joining (stitching) adjoining microscopic views to form a contiguous larger image also referred to as a mosaic. A microscope slide is digitized in that a computer-controlled stage is displaced in a controlled manner, a picture being taken following each displacing operation. The stage is displaced by a defined travel in each case, so that the next field of view either directly borders on the preceding one or overlaps the preceding one in a defined manner. However, the mechanics of microscope stages is inaccurate, so that there will be mispositionings. Therefore, the captured fields of view are typically registered toward one another on the part of software in a second step. In this context, different similarity measures such as area-based SSD or cross-correlation or least squares correlation as well as feature-based measures are employed. The precise positioning offset, or the transform between two images, is determined by determining the position in which the similarity measure reaches its maximum in the overlap area.

The transforms thus determined may be used for stitching the mosaic in a sequential manner, such as in the shape of a meander. However, since registration determination on the part of software is also faulty, such an approach will see an accumulation of alignment errors, and there will be a visual offset of the fields of view in the mosaic.

The need for a comprehensively operating optimization scheme becomes obvious when considering three images which have been aligned against one another and thus result in three transforms such as translational displacements about an offset vector in order to mutually align the three images correctly. In a perfect environment, said transforms will result in an overdetermined but consistent equation system: when concatenated they will result in an identity transform. However, since the transforms are measurements on real-world images exposed to noise and other deteriorations, the transforms will be susceptible to errors. The idea of optimization consists in minimizing the average measurement errors, for example by equally distributing same over all of the transforms.

There are several approaches which try to solve the problem that misalignments may accumulate in the event of a sequential alignment of the subimages. As was described above, the transforms should not only be taken into account sequentially, but the transforms from all of the overlap areas should be taken into account, such as in [7], for example. In this context, an equation system is set up which may be solved by means of an equalization calculation or other optimization methods. The technique described in [6] also falls into the category of said approaches.

Since the transforms determined are based on observations, not all of them are exact. Any solution of an equation system thus disturbed will therefore still be erroneous. An approach which minimizes said errors would be desirable.

Some works have already comprehensively addressed the problem set forth above. Said mosaicing algorithms may typically be categorized into two separate steps. In the first step, neighboring images are aligned in a pairwise manner by applying an area-based or feature-based registration algorithm. In a second step, the transform parameters thus estimated are then bundle-adjusted to obtain a globally consistent transform space. Szeliski [3] has presented an authoritative survey of both local and global image stitching methods. However, Szeliski's focus is on aligning multiple viewpoint images and producing panoramic images under affine transform constraints. However, this poses a more general problem than arises in virtual microscopy, where the transform space of the images is strictly translational. Consequently, in virtual microscopy, more specialized mosaicing algorithms may be used in order to obtain an optimum mosaic.

Davis [4] addresses the stitching of scenes with moving objects. Davis obtained a system of linear equations from pairwise alignments and solved the system by using a least squares approach to obtain a globally optimized transform space. What is problematic about Davis' approach is that by solving the system in a least error squares sense, Davis distributes the error equally over all transforms. However, this is justified only if the error in the transforms is strictly Gaussian in shape, which is not always the case. Kang et al. [5] proposes a graph-theoretic approach for global registration of 2D mosaics under projective secondary transform constraints. Surprisingly, there are only few articles directly dealing with stitching virtual slides. Sun et al. use feature matching with the Harris Corner detector and perform global geometric correction with an objective function which minimizes the Euclidean distance between the feature points when the transform is applied [6]. Appleton et al. address the image stitching problem as a global optimization problem [7]. They use dynamic programming and a similarity function in order to place a complete row of images with previously placed rows at a point in time. However, since they place only one row at a time, this is only partly a global optimization, which, in order to be complete, would involve placing all of the images at once. In addition, the process presented there would use an overlap of 45% between the images in order to achieve good results. This, again, results in a very long scan time. In [8], Davis' [4] idea of producing a linear equation system was used for the optimization problem and was weighted by weighting each transform according to its reliability. Consequently, the equation system was solved in a weighted least error squares sense. This approach entailed objectively improved results as compared to the unweighted approach. However, under specific conditions, even the latter approach still exhibits errors. It is mostly with slides having significantly large areas of low information content and, consequently, low correlation values that some of the subimages in these areas are not correctly repositioned.

In [14], a method of automatically creating a virtual microscope slide is described. Images are positioned exclusively on the basis of the erroneous positioning properties of the stage.

In [18], a method of software-related registration of virtual microscope slides is described. However, what is registered is only ever that part of the microscope slide which is currently rendered on the screen. Mosaic registration is effected sequentially.

In [17], a system of digitizing slides is described, but no registration algorithmics.

In [15], a method of automatically creating a virtual microscope slide is described. The system creates a microscope slide in that each image is automatically registered with the preceding one. A correction value is calculated from the offset information in terms of control engineering, and the stage is displaced in a corrected manner for capturing the next image. By using this method, a relatively precise virtual microscope slide may be created even by means of relatively imprecise stages. The accuracy of the stage is therefore taken into account, specifically in order to correct the stage in terms of control engineering. Mosaic registration is effected sequentially.

It would be desirable to have a concept for generating a mosaic picture of an object plane which functions in a more stable and, thus, in a qualitatively improved manner.

SUMMARY

According to an embodiment, an apparatus for generating a mosaic picture of an object plane may have: a capturing device for portion-by-portion capturing of the object plane at a two-dimensional distribution of capturing positions so as to acquire subimages which represent pictures of portions of the object plane which mutually overlap, while allocating the capturing positions to the subimages, the capturing device being configured such that the capturing positions allocated to the subimages deviate from actual capturing positions in accordance with error statistics; and a processor for determining offset vectors between pairs of mutually overlapping subimages by means of a similarity analysis of the overlapping subimages and for solving an optimization problem for finding an optimum set of capturing position variables for the subimages for minimizing a measure of a deviation between the offset vectors of the pairs of mutually overlapping subimages, on the one hand, and differences of the capturing position variables of the pairs of mutually overlapping subimages, on the other hand, while complying with a secondary constraint for the capturing position variables which depends on the error statistics, wherein the capturing device is configured to sequentially cycle through the two-dimensional distribution of capturing positions in a capturing path, the processor being configured such that the secondary constraint limits, in dependence on the error statistics, the difference of capturing position variables for pairs of subimages which immediately follow one another along the capturing path.

According to another embodiment, a method of generating a mosaic picture of an object plane may have the steps of: portion-by-portion capturing of the object plane at a two-dimensional distribution of capturing positions so as to acquire subimages which represent pictures of portions of the object plane which mutually overlap, while allocating the capturing positions to the subimages, the capturing device being configured such that the capturing positions allocated to the subimages deviate from actual capturing positions in accordance with error statistics; and determining offset vectors between pairs of mutually overlapping subimages by means of a similarity analysis of the overlapping subimages; and solving an optimization problem for finding an optimum set of capturing position variables for the subimages for minimizing a measure of a deviation between the offset vectors of the pairs of mutually overlapping subimages, on the one hand, and differences of the capturing position variables of the pairs of mutually overlapping subimages, on the other hand, while complying with a secondary constraint for the capturing position variables which depends on the error statistics, said portion-by-portion capturing being performed such that the capturing device sequentially cycles through the two-dimensional distribution of capturing positions in a capturing path, and the secondary constraint limits, in dependence on the error statistics, the difference of capturing position variables for pairs of subimages which immediately follow one another along the capturing path.

Another embodiment may have a computer program including a program code for performing the method of generating a mosaic picture of an object plane, which method may have the steps of: portion-by-portion capturing of the object plane at a two-dimensional distribution of capturing positions so as to acquire subimages which represent pictures of portions of the object plane which mutually overlap, while allocating the capturing positions to the subimages, the capturing device being configured such that the capturing positions allocated to the subimages deviate from actual capturing positions in accordance with error statistics; and determining offset vectors between pairs of mutually overlapping subimages by means of a similarity analysis of the overlapping subimages; and solving an optimization problem for finding an optimum set of capturing position variables for the subimages for minimizing a measure of a deviation between the offset vectors of the pairs of mutually overlapping subimages, on the one hand, and differences of the capturing position variables of the pairs of mutually overlapping subimages, on the other hand, while complying with a secondary constraint for the capturing position variables which depends on the error statistics, said portion-by-portion capturing being performed such that the capturing device sequentially cycles through the two-dimensional distribution of capturing positions in a capturing path, and the secondary constraint limits, in dependence on the error statistics, the difference of capturing position variables for pairs of subimages which immediately follow one another along the capturing path, when the program runs on a computer.

The core idea of the present invention consists in having recognized that a stability and, thus, also a quality of the picture, or mosaic, generation may be improved when the advantages of global optimization are exploited while giving up performing the optimization fully on the basis of mutual alignment of the image information alone, i.e. on the basis of the result of a search for similarities, but when, additionally, information about error statistics of the capturing device, which took over portion-by-portion capturing of the object plane, is instead also taken into account in the positioning of the subimages in that a secondary constraint (secondary constraint) is set up for the capturing position variables in the optimization problem.

BRIEF DESCRIPTION OF THE DRAWINGS

Embodiments of the present invention will be detailed subsequently referring to the appended drawings, in which:

FIGS. 3a and 3b show schematic views for illustrating the two-dimensional distribution of capturing positions in accordance with two embodiments;

FIGS. 3c and 3d show schematic views for illustrating capturing path that are alternative to that underlying FIGS. 3a and 3b by way of example;

FIGS. 7a and 7b show explicit examples of matrices A and C within the quadratic optimization problem in accordance with an embodiment for the example of the arrangement of views of FIGS. 4a-5.

DETAILED DESCRIPTION OF THE INVENTION

Figure 1:
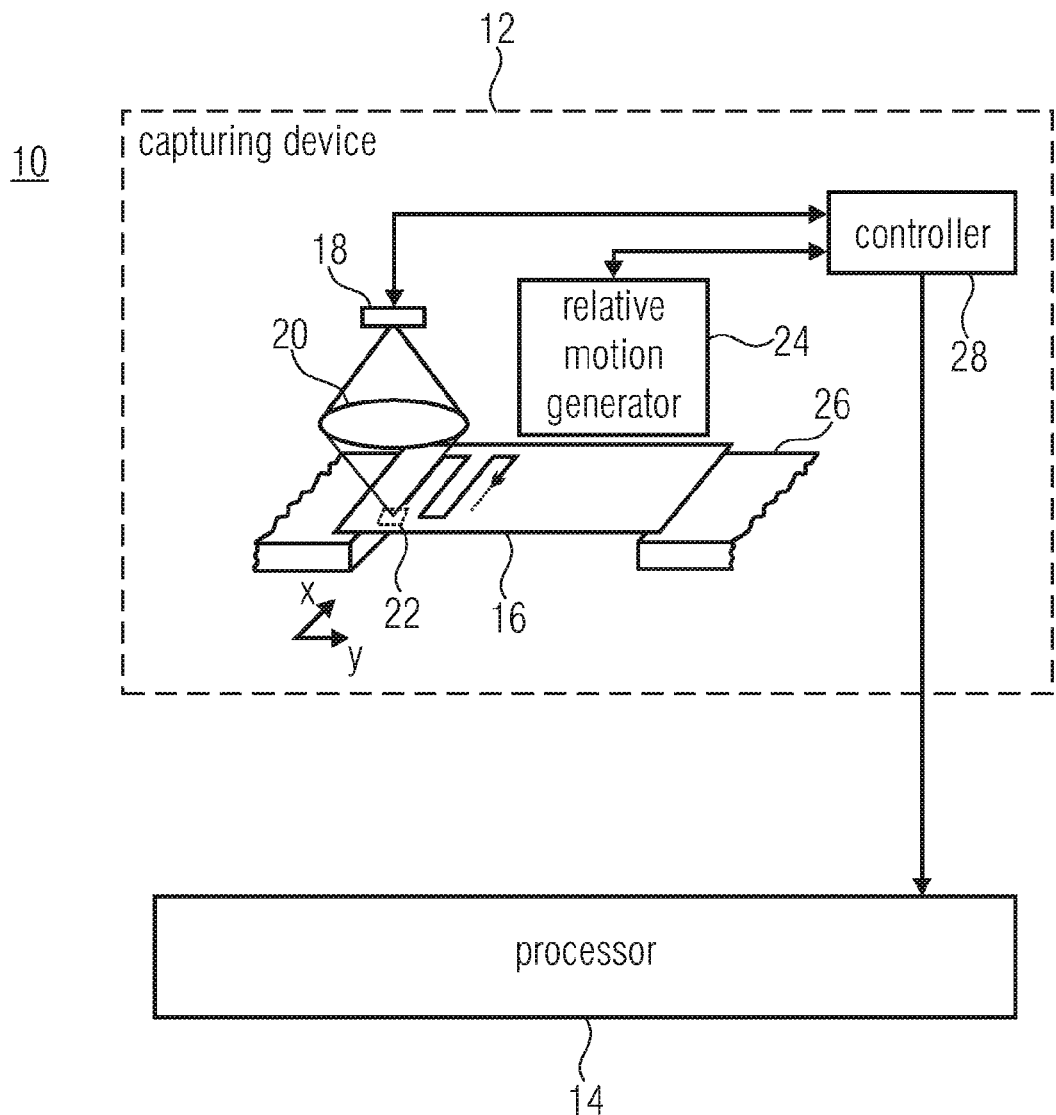
FIG. 1 shows a block diagram of an apparatus for mosaic capturing of an object plane in accordance with an embodiment.

FIG. 1 shows an apparatus for generating a mosaic picture of an object plane in accordance with an embodiment of the present application, the apparatus generally being indicated by 10.

The apparatus 10 includes a capturing device 12 and a processor 14. The capturing device is configured to capture, or scan, an object plane 16, such as a prepared slide having a sample, at a two-dimensional distribution of capturing positions portion by portion so as to obtain subimages presenting pictures of portions of the object plane 16 which mutually overlap, specifically while allocating the capturing positions to the subimages, the capturing device being configured such that the capturing positions allocated to the subimages deviate from actual capturing positions in accordance with error statistics. Details on this will be provided below.

The processor 14 is configured to determine offset vectors between pairs of mutually overlapping subimages by means of a similarity analysis of the overlapping subimages, and to solve an optimization problem for finding an optimum set of capturing position variables for the subimages for minimizing a measure of a deviation between the offset vectors of the pairs of mutually overlapping sub-images, on the one hand, and differences in the capturing position variables of the pairs of mutually overlapping subimages, on the other hand, while complying with a secondary constraint for the capturing position variables which depends on the error statistics. Details on this will also be provided below.

As is shown in FIG. 1, the capturing device 12 may comprise, e.g., an image sensor 18, optical device 20 for imaging a field-of-view section 22 of the object plane 16 onto the image sensor, as well as a relative motion generator, or motor, 24 for causing a lateral relative motion between the object plane 16, on the one hand, and the image sensor 18 and the optical device 20, on the other hand. The capturing device 12 is an automated microscope system, for example, and the image sensor 18 and the optical device 20 may be part of a microscope, for example, such as of a microscope for reflected light or a microscope for transmitted light. Accordingly, the optical device 20 may be a microscope objective. As was already mentioned above, the object plane 16 may be a slide having a suitable sample such as a blood smear located thereon. The relative motion generator, or motor, 24 may be a positioning table or a computer-controlled stage, for example, and even though it would be possible to move the arrangement consisting of the image sensor 18 and the objective 20 opposite the object plane 16, it is advantageous for the relative motion generator to move the object plane 16 relative to the arrangement consisting of the image sensor 18 and the optical device 20, as is indicated by a mounting 26 which supports the object plane 16, or the slide, and is part of the above-mentioned stage, for example.

As can be seen, the relative motion generator 24 is capable of generating a lateral relative motion in two lateral dimensions x and y.

As is also shown in FIG. 1, the capturing device 12 may also comprise a controller 28 for controlling the relative motion generator 24 and the image sensor 18, namely such that the object plane 16 is captured at the above-mentioned two-dimensional distribution of capturing points. Moreover, the controller 28 is configured to forward the subimages, which have been obtained at the two-dimensional distribution of capturing points, together with the associated capturing positions to the processor 14, which suitably processes said information, as will be described below. However, it shall be noted that the controller 28 and the processor 14 may also be jointly implemented on one and the same computer, such as in the form of a shared program or of separate programs executing on a computer. However, there are other possibilities as well. For example, the controller 28 of the capturing device 12 might utilize a CPU of its own, might be realized in an FPGA or in hardware, such as in an ASIC, for example, and the processor 14, in turn, might comprise a CPU of its own on which a suitable program is executed, or may be implemented as an FPGA or the like, in which case the processor 14 will then output the result of the processing, namely the mosaic picture, in a suitable form, e.g. in the form of storage on a data carrier, such as the subimages together with the optimized set of capturing positions that was determined during processing, and/or by indicating the stitched mosaic picture on a screen and/or by storing the individual pictures, which have merged into an overall image, in accordance with the optimized set of capturing positions.

To give a more specific example, the capturing device 12, for example, may be a fully automated microscopy system which includes, e.g., a Leica DM6000B microscope having a z axis as the optical device 20, a displaceable stage of Ludl Electronic Products as the relative motion generator 24, and a color camera as the image sensor 18, it being possible for the color camera to be a Pike model by Allied Vision Technologies. The above-mentioned sample on a slide may be, for example, one of such samples which are to be examined cytometrically and histologically. To this end, the subimages captured by the capturing device 12 may be captured, e.g., by means of an optical device 20 which provides 20-fold magnification. For blood smear slides, the capturing device 12 might perform scanning at a 10-fold magnification, for example. The capturing device 12 may allow, e.g., manual or automated switching between different objectives as the optical device 20. For example, the camera produces 1000×1000 pixel subimages with a CCD chip of a diagonal screen size of 10.5 mm and an effective CCD cell size of 7.4×7.4 $\mu m^2$. For 10-fold magnification, this results in a coverage of the area to be captured of 0.74×0.74 $\mu m^2$ per pixel, and 0.37×0.37 $\mu m^2$ per pixel for 20-fold magnification. The capturing device 12 may be calibrated such that there is accurate conversion between pixel coordinates of the camera and hardware coordinates of the relative motion generator 24. The latter may comprise, e.g., a resolution of 0.4 $\mu m$, a repeatability of 2.0 $\mu m$ and an accuracy of 10.0 $\mu m$. Given such exemplary values for relative motion precision, it is obvious that the mutual alignment of the subimages cannot be performed solely on the basis of the mechanical accuracy of the relative motion generator 24 and/or the capturing positions allocated to the subimages by the capturing device 12.

Now that the architecture of the apparatus of FIG. 1 has been described above, its mode of operation in accordance with an embodiment will be described below by means of FIG. 2.

Figure 2:
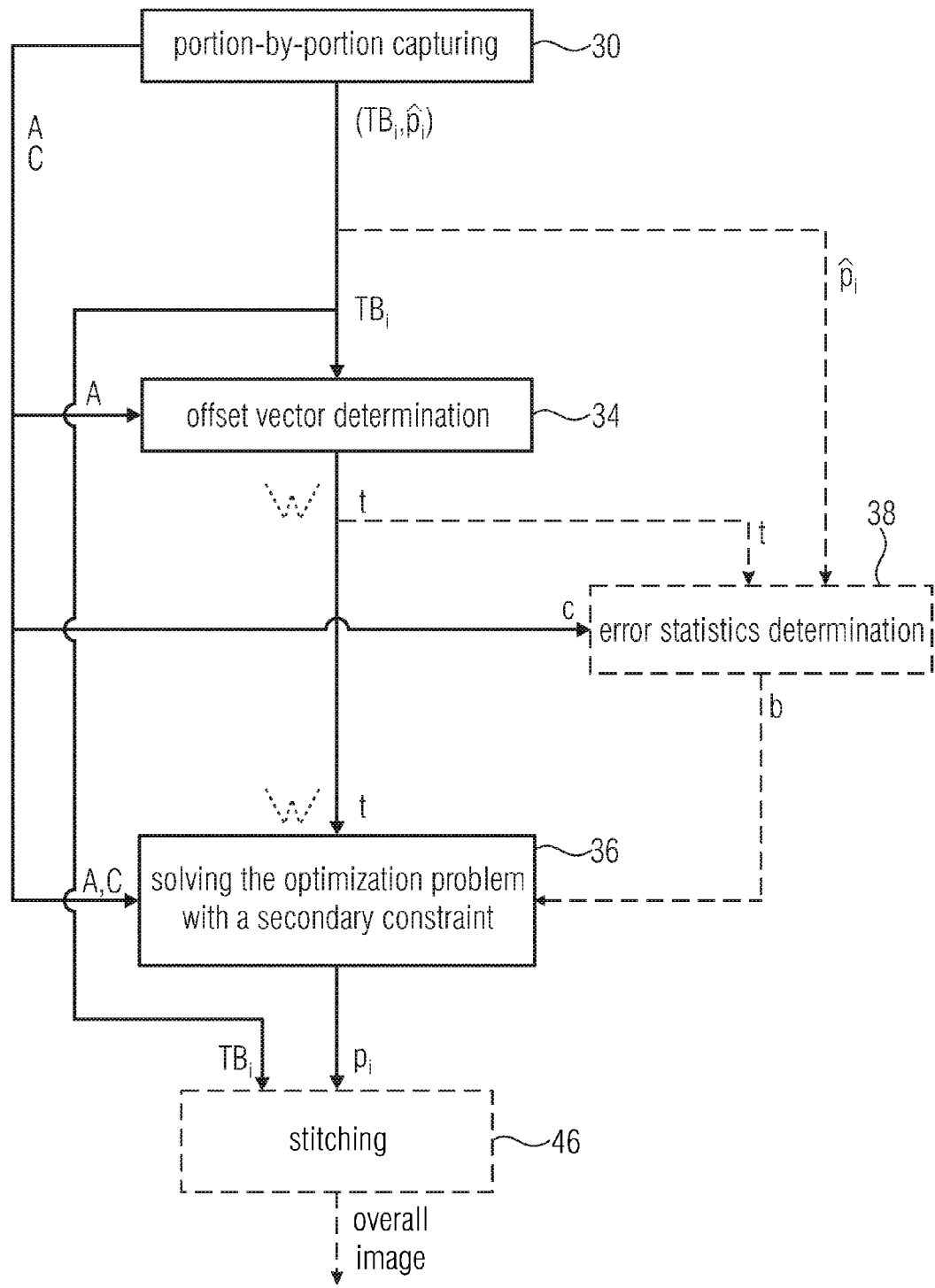
FIG. 2 shows a flowchart of a mode of operation of the apparatus of FIG. 1 in accordance with an embodiment.

FIG. 2 shows the process steps involved in generating a mosaic picture. As is shown in FIG. 2, the method starts with a step 30 of capturing the object plane 16 on the part of the capturing device 12 in a portion-by-portion manner. As will be explained in more detail below, the capturing device 12 is configured, e.g., such that the above-mentioned two-dimensional distribution of capturing positions is sequentially cycled through in one capturing path. In other words, the capturing device 12 sequentially scans the object plane 16 to obtain the subimages at the capturing positions. In accordance with embodiments described below, the object plane is scanned while using a meander-shaped capturing path, or zigzag path, whereupon alternately a relative motion from the left to the right, from the right to the left and from top to bottom, or, in general terms, along a to direction, a fro direction and an advance direction takes place. Capturing of the subimages may be performed, for example, with a mutual overlap of 20% of the image size of neighboring images. Accordingly, there is thus already an estimation of where each subimage is located in the virtual overall image and of how the subimages mutually overlap.

To illustrate this, reference shall be made to FIG. 3a. FIG. 3a shows a section of an object plane which has been scanned, in step 30, by way of example in a regular distribution of nine subimages $TB_1$-$TB_9$. By way of example, a dashed line 32 indicates an example of a capturing path, this path running in a meander shape; of course, other paths would also be possible. The capturing positions of the subimages $TB_1$-$TB_9$ are indicated by little crosses in FIG. 3a. They form a regular 3×3 grid, i.e. are arranged in rows and columns. The capturing positions of the subimages $TB_1$-$TB_3$ and the subimages $TB_1$-$TB_3$ themselves are thus located within one row, and the subimages $TB_2$, $TB_5$, and $TB_9$ and their capturing positions are thus located within a column, by way of example. However, even this arrangement of the capturing positions is merely an example, and the subsequent embodiments may easily also be transferred to other distributions of capturing positions.

To render the overlap of the subimages $TB_1$-$TB_9$ somewhat clearer, the contour of the subimage $TB_1$ is emphasized by slightly thicker dashed lines. As was already mentioned above, the capturing positions are arranged such that neighboring subimages will overlap, specifically both in the row direction and in the column direction as well as diagonally. Diagonal overlaps will be neglected in the following, but might also be taken into account. All in all, in this manner there are twelve different pairs of neighboring subimages. Some of them, here eight pairs, by way of example, are mutually adjacent not only in the two-dimensional arrangement, but they also immediately follow one another even along the capturing path 32 and/or in the capturing order.

Thus, FIG. 3a shows that planning of the portion-by-portion capturing in step 30 already provides some knowledge of the mutual positions of the subimages $TB_1$-$TB_9$ in advance. If the subimages $TB_1$-$TB_9$ had actually been captured at the positions marked by little crosses in FIG. 3a, the mosaic picture would already be finished. However, as was already mentioned above, the capturing device 12 exhibits error statistics according to which the capturing positions allocated to the subimages deviate from actual capturing positions.

Merely for illustrative purposes, said actual capturing positions are shown with points in FIG. 3a, each of which is located in the vicinity of a little cross but actually deviates from said little cross. Said little crosses are obviously not known, and it is the purpose of the processing within the processor 14 and of the subsequent steps in the method of FIG. 2 to determine a good estimation and, at best, exactly the actual capturing positions.

It shall therefore be stated once again that planning of the portion-by-portion capturing 30 already provides information, in advance, about how many subimages will form, which of said subimages will be mutually adjacent, and which of the neighboring pairs of subimages will be captured one directly after the other. It is therefore indicated in FIG. 2 that step 30 results not only in the subimages $TB_i$ with their associated supposed capturing positions $\hat{p}_i$, but also in information containing the neighborhood information, for which FIG. 2 symbolically uses letters A and C, which represent matrices which will be used later on in the optimization problem, and for which FIGS. 7a and 7b provide exemplary examples of what the matrices A and C were like in this optimization problem if they were produced for the capturing planning in accordance with FIG. 3a. For example, FIG. 7a shows that the matrix A comprises nine columns, namely one column for each subimage $TB_i$, i simultaneously also indicating the column address. As may be seen, 12 rows exist in the matrix A, of which each row comprises, except for zeros, merely one −1 and one 1, namely precisely for such subimages which are mutually adjacent. The first row of the matrix A of FIG. 7a thus indicates that the subimages $TB_1$ and $TB_2$ are mutually adjacent, and the second row indicates that the subimages $TB_1$ and $TB_6$ are mutually adjacent, as may also be seen in FIG. 3a. Similarly, the matrix C of FIG. 7b also comprises nine columns for the subimages $TB_i$, in turn also corresponding to the column address, or column number, from the left to the right. The matrix C comprises 16 rows, namely 2×8 rows, namely for each pair of adjacent subimages which have also been captured one directly after the other, i.e. for each pair of subimages which are immediately adjacent along the capturing path 32. For each such pair, the matrix C comprises two rows wherein in each case one 1 and one −1, and vice versa, are arranged except for zeros in the corresponding positions. The significance of the matrices A and C will become even clearer from the following discussion of the optimization problem. At this point, reference shall merely be made also to the knowledge about the neighboring relations, said knowledge already being known from capturing planning.

Thus, as has just been mentioned, said portion-by-portion capturing 30 may comprise previous planning of said portion-by-portion capturing, such as selecting the capturing positions and the associated magnifications and/or the sizes of the fields of view of the subimages, etc. For example, it would be possible for the controller 28 to dictate the target capturing positions of FIG. 3a to the relative motion generator 24 and to allocate said target capturing positions to the subimages $TB_i$ as the previously mentioned capturing positions, and to instruct the image sensor 18—upon a confirmation signal for confirming attainment of the target position on the part of the relative motion generator 24—to generate a respective subimage $TB_i$; the relative motion generator 24, in turn, might be configured to regulate a relative lateral location between the object plane 16, on the one hand, and the image sensor 18 and the optical device 20, on the other hand, for such time until the target capturing positions are supposedly attained, and to then transmit the confirmation signal to the controller 28 in each case.

The connection between planning, on the one hand, and the capturing positions allocated to the subimages on the part of the capturing device 12, on the other hand, may also be loosened somewhat, however. For example, FIG. 3b illustrates a possibility according to which the controller 28 is configured to dictate merely the capturing path 32 to the relative motion generator 24 and to instruct the image sensor 18—at predetermined capturing times, which in the case of an ideal and/or to-be-expected mode of operation of the relative motion generator 24 would result in the target positions of FIG. 3a, for example—to generate a respective subimage $TB_i$, and to instruct the relative motion generator 24 to detect a momentary relative location position at the respective capturing time, which relative location position will then be allocated as the capturing position to that subimage $TB_i$ which is generated at the respective capturing time. In this case, the relative motion generator 24 in its turn would change the relative location position between the object plane 16, on the one hand, and the image sensor 18 and the optical device 20, on the other hand, in accordance with the predefined capturing path 32 and would detect, upon the instructions from the controller 28, the momentary relative location position as instructed. As is shown in FIG. 3b, in this case the capturing positions, which are allocated to the detail images, also indicated by little crosses in FIG. 3b, and which are forwarded from the capturing device 12 to the processor 14, would not be located within the regular grid quite as strictly as was the case in FIG. 3a, even if the deviation is not large. However, even in the case of FIG. 3b, an error statistics exists with regard to the deviation between the positions provided by the relative motion generator 24, on the one hand, and the actual capturing positions, on the other hand, the latter also being indicated by points in FIG. 3b.

Before providing a further description of the method of FIG. 2, FIGS. 3c and 3d will show, for completeness' sake, alternatives to the meander-shaped capturing path as underlies subsequent embodiments by way of example. For example, FIG. 3c shows a capturing path 32' which starts in a circular manner from a center of the mosaic picture and/or from a central subimage $TB_1$ among the arrangement of subimages, and FIG. 3d shows a capturing path 32" which restarts, row by row, at the left-hand edge of the subimage arrangement again and again and scans the subimages row by row from the topmost to the bottommost row.

As is shown in FIG. 2, step 30 is followed by a step 34 of determining offset vectors between pairs of mutually overlapping subimages by means of a similarity analysis and of the overlapping subimages. In other words, the similarity analysis in step 34 is, a search for an offset vector between pairs of adjacent subimages within a predetermined search space of potential offset vectors, which results in a maximum similarity between said two subimages within the overlap area of same, such as in the sense of the square of the error or the like, wherein the search may be performed, for example, by means of cross correlation or while using the Fourier transform thereof, namely the cross power density or the cross power spectrum or the like. The previously mentioned search space may exclude the search among such offset vectors which are simply not to be expected statistically. However, it is also possible to perform the similarity search across all of the offset vectors, e.g. to fully calculate the cross correlation of the subimages. Area-based SSD or cross correlation or a least squares correlation as well as feature-based measures may be used. The precise positioning offset and/or the transform between two images may be determined by determining the position at which a corresponding similarity measure in the overlap area reaches its maximum.

For determining the transform and/or the offset vector between overlapping subimages, use is advantageously made of the inversely transformed cross power density with the Foroosh et al. extension [10] for subpixel accuracy. It can be shown that the cross correlation is the optimum statistical estimation function estimator—when assuming the translational displacement among the subimages as underlies present embodiments—and is purely additive whiteGaussian noise [11]. For the case of the normalized cross power density, this cannot be shown analytically. However, in contrast to cross correlation, inversely transformed normalized cross power density has the advantage that the correlation energy is fully concentrated at one point or, in the case of a subpixel offset, in the immediate neighborhood of the peak. The simplicity and reliability of detecting this point makes the inversely transformed normalized cross power density a very attractive method for step 34. Additionally, this method offers the possibility of determining a measurement of the quality of the offset vector determined in each case. In other words, step 34 may also include the step of determining a measure of a similarity of those subimages which have been mutually offset with the offset vector determined within the overlap area. Two images which perfectly match each other and are not damaged by noise or the like would result, e.g., in a correlation value of 1 as the peak correlation value. Consequently, smaller correlation values would constitute an indication that the resulting offset values, or the determined offset values, are less reliable. In this context, it shall be noted that in light microscopy, that area where no information content or no object is available will invariably be white since the light may penetrate the slide 16 and the optical device 20 unimpededly and reach the detector 18. This means that in the similarity search between two subimages captured in an area of the slide having no information content, a correlative approach in the similarity analysis in a correlation value close to the maximum of 1 would almost continuously lead across the search space. To avoid this problem, in step 34, each subimage is advantageously inverted prior to correlation.

As has just been mentioned, step 34 of offset vector determination is performed for any pairs of adjacent subimages. In particular, in step 34 the offset vector in relation to its right-hand and its lower neighbor is determined, as is shown in FIG. 4b, for each subimage, except for those subimages along the lower right-hand edge of the entire arrangement of subimages. If all of the similarity analyses in step 34 for each pair of adjacent subimages led to the actually correct result, the offset vectors $t_{ij}$ would actually all meet in one point, irrespective of the subimage from which one starts, and irrespective of the path one takes toward a different subimage via offset vectors.

Incidentally, it shall be noted that in FIG. 4b, the positions of the subimages $TB_i$ are indicated by $p_i$, i.e. not by $\hat{p}_i$ since, as is known, new determination may be performed via solving an optimization problem, as will become clear in the subsequent description of FIG. 2, on account of the error statistics to which the detection of the positions $\hat{p}_i$ is prone. Thus, the vectors $p_i$ indicate the estimates, which are still to be sought for, for the actual positions of the subimages $TB_i$.

Figure 4A:
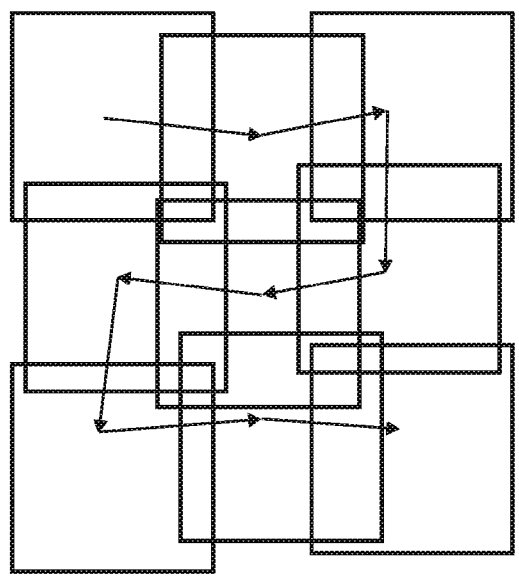
FIG. 4a shows a schematic representation of a mosaic of subimages arranged in accordance with offset vectors which have been determined by means of a similarity analysis between pictures captured one directly after the other.
Figure 4B:
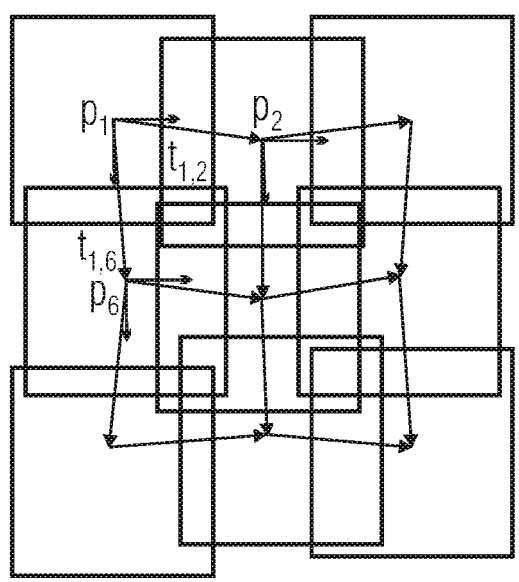
FIG. 4b shows a schematic representation of the arrangement of subimages of FIG. 4a, however, while illustrating the problems which arise when the further offset vectors between the further pairs of neighboring views are additionally taken into account.
Figure 5:
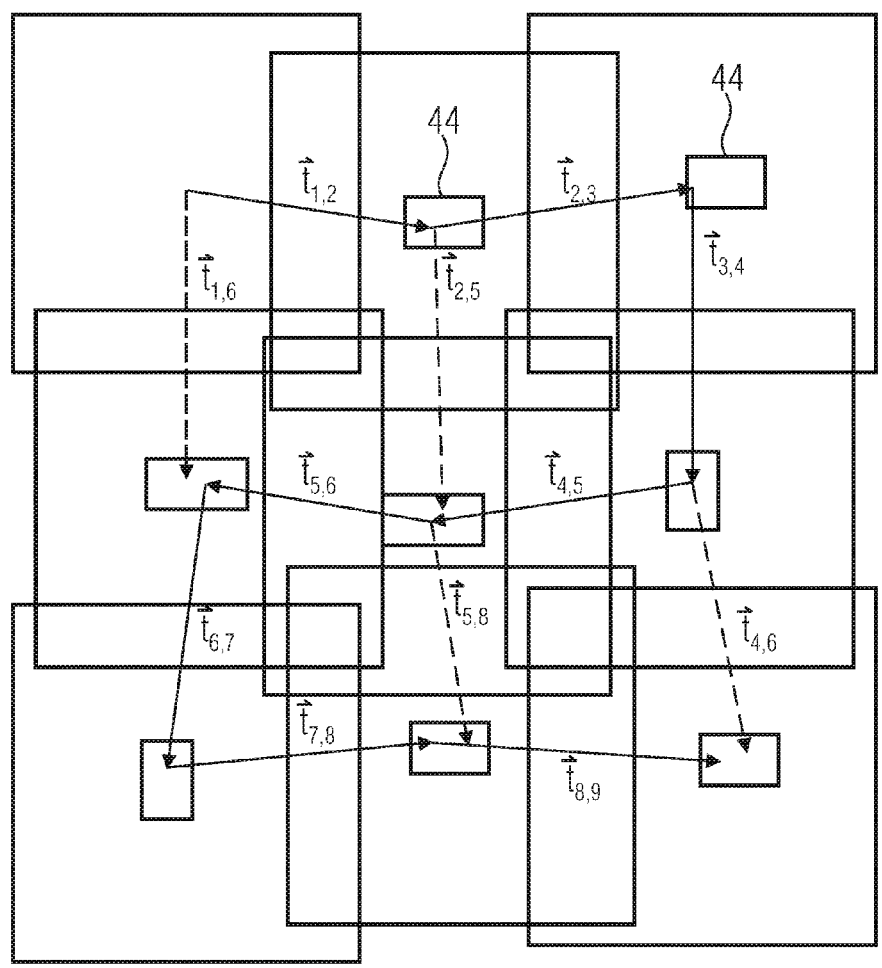
FIG. 5 shows a schematic representation of an arrangement of subimages with offset vectors as have been determined by means of a similarity analysis between neighboring views, and while illustrating the secondary constraint for capturing position variable differences of pairs of views which have been captured one directly after the other in accordance with an embodiment.

FIG. 4a shows the subset of offset vectors which has been determined among the subset of pairs of adjacent subimages $TB_i$ which have been captured one directly after the other in the direction of the capturing path. As was mentioned above, the exemplary example having nine subimages which have been captured in a 3×3 arrangement comprises eight pairs. Ambiguities in the global positioning of the subimages will not result if only those offset vectors of FIG. 4a are used. However, errors will result specifically due to error-determined offset vectors of step 34. By way of example, FIG. 5 shows the additional offset vectors of pairs of adjacent, mutually overlapping subimages which do not overlap along the capturing path. In FIG. 5, they are depicted by dashed lines, and even though they start at the end and base points of the offset vectors of the pairs of subimages directly succeeding one another in the direction of the capturing path, they do not end at any of the end and/or base points of said offset vectors depicted by continuous lines. It is therefore the aim of the optimization problem described below to find optimum positions p, of the subimages $TB_i$ such that despite the error determinations in the offset vectors, the correct actual positions of the subimages $TB_i$ in relation to one another are found and/or estimated.

Thus, FIG. 4a comparatively also shows a schematic of a continuous alignment process wherein only the transform parameters of the direct predecessor are taken into account. In a global optimization scheme as is presented in accordance with the present embodiment, any transform parameters of the neighboring images are taken into account, as is depicted in FIG. 4b. In addition, in FIG. 4b, three images are marked with their image coordinate systems and their global positioning $p_i$. The two translation vectors $t_{i,j}$, which convert said images within the coordinate space from one to the other, are also marked. FIG. 5 shows a schematic of a scanning operation of 3×3 fields of view, or subimages. The arrows mark the transforms obtained by the similarity analysis, such as the normalized cross power spectrum, for example, the continuous arrows additionally showing the order of the successive meander-shaped scanning caused by the relative motion generator 24. The rectangles visualize the borders within which each field of view may be rearranged later on in the optimization in the scan order in relation to its direct predecessor, which will be addressed below in the context of the secondary optimization constraint; said subsequent description will also provide the reason for the three different sizes of the rectangles which mark the three different rectangular boundaries for the right-to-left, left-to-right and top-to-bottom scan orders.

Global positioning $p_j$ of the subimage $TB_j$ may thus be calculated by initially calculating the positioning of the adjacent subimage, namely p, of the subimage $TB_i$, and by subsequently applying the offset vector $t_{ij}$ for arranging the subimage $TB_i$ to be spatially opposite the subimage $TB_j$:

$$p_j = p_i + t_{i,j} \rightarrow p_j - p_i = t_{i,j} \text{ with } 1 \leq i, j \leq N \quad \text{Equation 1}$$

If the image $TB_1$ is set to the origin of the coordinate system of the virtual slide, and if all of the offset vectors are taken into account, it will be possible to set up a sparsely populated linear equation system wherein the offset vectors $t_{ij}$ represent the known parts of the equations:

$$A \begin{bmatrix} p_1 \\ \ldots \\ p_N \end{bmatrix} = \begin{bmatrix} t_{1,2} \\ \ldots \\ t_{N,N-1} \end{bmatrix} \rightarrow Ap = t. \quad \text{Equation 2}$$

However, since—as was shown above with reference to FIG. 5—each subimage in a 4-connected neighborhood has two or more neighbors, this system is overdetermined. In step 36, therefore, the system is solved in the sense of an optimization, such as in the sense of least square errors. In particular, step 36 includes solving an optimization problem for finding an optimum set of capturing position variables $p_i$ for subimages $TB_i$ for minimizing a measure of a deviation between the offset vectors $t_{i,j}$ of the pairs of mutually overlapping subimages, on the one hand, and differences in the capturing position variables $p_i-p_j$ of the pairs of mutually overlapping subimages, on the other hand, while complying with a secondary constraint for the capturing position variables which depends on the error statistics. Accordingly, the matrix A of equation 2 is made in such a way that it combines the capturing position variables $p_i$ with each other in a pairwise manner such that the respective offset vector is interrelated with the respective capturing position variable difference.

It is noted that in equation 2, the vector t strictly speaking not only comprises 12 components, as might be indicated by FIG. 7a and/or by the fact that 12 offset vectors exist for the example of FIG. 5, but that the vector t in fact actually comprises 24, i.e. twice as many components as offset vectors, namely for each offset vector, the component of the respective offset vector in the x direction and in the y direction. The same applies to the vector p in equation 2, and with regard to FIG. 7a it shall be noted that, strictly speaking, every component entry in FIG. 7a represents a corresponding 2-component vector having two equal component entries, namely of the corresponding number which is located at the corresponding location in the matrix A.

Compliance with the secondary constraint may be formulated in accordance with equation 7, which will be explained below. In the following, a specific kind of determination of the secondary constraint from the error statistics will be described; however, in addition, other possibilities exist as well, as will be mentioned following the description of the figures.

To render the optimization approach, such as the least error squares approach, more stable in relation to the erroneous offset vector determinations in step 34, it is advantageous to determine each equation with a measure of the similarity of the subimages $TB_i$ and $TB_j$ in the overlap area in accordance with their respectively associated determined offset vector $t_{ij}$, such as the previously mentioned peak correlation value of the transform. This results in a diagonal weighting matrix W with the corresponding weighted least squares problem:

$$\underset{p}{\mathrm{argmin}}(\|W(Ap-t)\|^2) \qquad \text{Equation 3}$$

For example, offset vectors resulting in a correlation value of less than 0.15 are weighted with 0. Consequently, the corresponding diagonal entry in the matrix W will be zero.

This would result in that unreliable offset vector determinations would not be taken into account and therefore would not negatively influence the optimization result. The threshold value of 0.15 is only an advantageous embodiment in this context, and other values are also possible, of course. Of course, the positioning accuracy of the capturing device 12 is not only dependent on the mechanical and controlling accuracy of the relative motion generator 24, such as the positioning table, but also on the accuracy of the calibration scheme used for calibrating the relative motion generator 24. For example, direction-dependent offset error values in determining capturing positions $\hat{p}_i$ may arise due to miscalibration or rounding errors. If, as was described above, a meander-shaped capturing path 32 is used, by way of example, for scanning the object plane 16, there will be three different directions, such as from the left to the right, from the right to the left and from top to bottom, which may be separately analyzed with regard to the error statistics and are actually analyzed separately in accordance with the embodiment described in the following. Since the positioning table in accordance with the embodiment of FIG. 3a is invariably displaced by the same distance for each of the three directions mentioned, the calibration-dependent error offset should be consistent in the respective direction.

In accordance with the embodiment of FIG. 2, provision is now made for determining the error statistics of the capturing device 12 in step 38 on the basis of the result of the portion-by-portion picture taken in step 30. However, as is indicated by the utilization of dashed lines, this determination on the basis of the pictures of the mutually aligned subimages themselves is not absolutely mandatory. Error statistics determination might also be performed on the basis of a previously performed calibration for the apparatus 12, whereupon the error statistics thus determined would then be used for subsequent optimization of results of portion-by-portion capturing in accordance with step 30. Such an advance determination of the error statistics might be performed in the manner described below, namely by means of portion-by-portion capturing of an object plane; however, in this case of calibration, no real sample needs to be used, for example, but, e.g., a suitable calibration object might also be captured portion by portion.

In particular, error statistics determination 38 utilizes the capturing positions $\hat{p}_i$—as are obtained from the capturing device 12—allocated to the subimages $TB_i$, specifically along with and/or in comparison with the offset vectors which have been determined in step 34 for those pairs of subimages which overlap one another along the direction of the capturing path. In accordance with an alternative embodiment, other determined offset vectors might also be additionally or alternatively taken into account in the error statistics determination 38.

For error statistics determination 38, for example the error offset vector $t_{off}$ between the offset vectors as result from the outputs of the capturing device 12 upon movement of the relative motion generator 24 in a specific direction, namely $t_{proj}=\hat{p}_j-\hat{p}_i$, and the detected offset vectors $t_{ij}$ may be taken into account:

$$t_{off}=t_{proj}-t. \qquad \text{Equation 4}$$

Such deviations thus result for eight pairs of subimages $TB_j$ and $TB_i$ which have been captured one directly after the other, specifically for the lateral dimension along the x axis and the y axis in each case.

To obtain a measurement of the calibration-dependent offset value, the mean value in the x and y directions of $t_{off}$ for the three scanning directions of the capturing path 32 might be calculated as the measure of the central tendency. However, even though the inversely transformed, normalized cross power density is a very reliable estimator for the offset values $t_{i,j}$, under real conditions erroneous determinations and, thus, misregistrations, or outliers, often arise in the distribution of $t_{off}$. While using the mean value for determining the central tendency, far too much importance might be attached to an outlier. Consequently, it is advantageous to calculate a more robust measure of the central tendency, namely, e.g., the median along the x direction, i.e. the median of the distribution of $t_{off}$ of the differences for the pairs of directly consecutive subimages in the respective scanning direction, and the same for the y component in the y direction, which results in $\mu_{y-off}$. Both are estimators for the calibration-dependent offset. They may be determined for each of the three directions. The median may be calculated, for example, by sorting the corresponding component of the vectors $t_{off}$ involved, for example from small to large, and by subsequently taking the mean value, both of which is done for both the x component and the y component and subsequently for each scanning direction. However, one might also use a mean value of a population, adjusted in terms of statistical outliers, of the error offset vector $t_{off}$.

Figure 6:
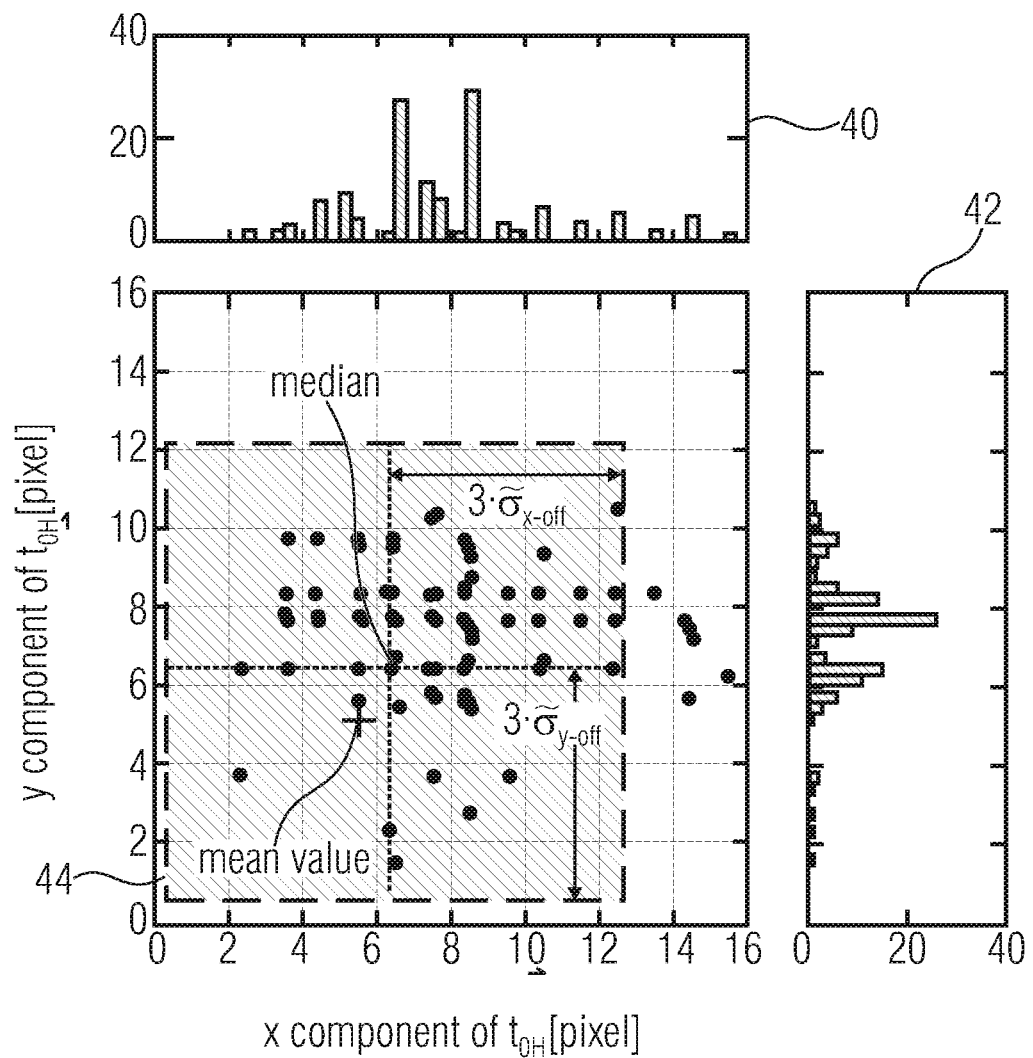
FIG. 6 shows a diagram showing the distribution of differences between the capturing positions of pictures captured one directly after the other as are provided by the capturing device and showing the offset vectors which have been determined for said pairs by similarity analysis, and the associated statistical distributions in both lateral dimensions.

For example, FIG. 6 shows a plot of error offset vectors $t_{off}$, plotted for a scan along one of the scanning directions in the case of a relatively large number of subimages as are shown in FIGS. 3a-5 by way of example. The component values are plotted in units of pixels, i.e. measured at a distance of a pixel from the next one in the subimages within the object plane. As may be seen, error offsets occur, which add up to about 16 pixel repeat distances. FIG. 6 was based on a horizontal scan, which is why scattering of the error offset values is larger in the x direction than in the y direction. Next to the plot of the error offset vectors $t_{off}$, FIG. 6 depicts a histogram 40 of the distribution of the x component values and/or a distribution 42 of the y component values.

The scatter diagram of FIG. 6 comprising the histograms 40 and 42 thus visualizes the error statistics of the capturing device 12 used in portion-by-portion capturing 30, as is reflected in the error offset vectors $t_{off}$ (cf. equation 4). In particular, this is shown in FIG. 6 for a typical scan, namely in an exemplary manner for the case where the relative motion generator 24 and/or the positioning table 24 moves from the left to the right. Additionally, the mean value and the median are shown in FIG. 6 by way of example as measures of the central tendency of the distribution of the error offset vectors $t_{off}$. It can clearly be seen that the median provides a better estimate of the calibration-dependent offset than does the mean value. Since the distribution in the x and y directions is not Gaussian-shaped, the mean value is further away from the center of distribution than is the median.

In other words, FIG. 6 shows a scatter diagram and the histogram of the calculated offsets between the relative motion translation vectors obtained by similarity analysis and the measured relative motion translation vectors in accordance with equation 4. By way of example, the diagram of FIG. 6 is the result of scanning 170 fields of view or subimages, when scanning is performed from the left to the right. The rectangle 44 visualizes the bound constraints with ±3 times the mean absolute deviation with regard to the median value in the x and y directions.

The mechanical and controlling accuracy of the relative motion generator 24 results in error offset vectors $t_{off}$, which vary around the median determined. This can also be clearly seen in FIG. 6. The standard deviation may be used as an estimate of this scattering, i.e. as a measure of the dispersion, however it is advantageous to use the median absolute deviation in the x direction, namely $\tilde{\sigma}_{x\text{-}off}$, and in the y direction, namely $\tilde{\sigma}_{y\text{-}off}$, as the basis for error statistics detection. To this end, for example, the median is subtracted from each value of the distribution 40 and 42, respectively, i.e. $\tilde{\mu}_{x\text{-}off}$ and $\tilde{\mu}_{y\text{-}off}$, respectively, whereupon the absolute value of each difference thus determined is determined so as to put the absolute values thus determined into an order again and to determine the median of the distribution of absolute values. Thus, $\tilde{\sigma}_{x\text{-}off}$ and $\tilde{\sigma}_{y\text{-}off}$ result. To simplify matters, in the following the vector consisting of $\tilde{\mu}_{x\text{-}off}$ and $\tilde{\mu}_{y\text{-}off}$ will be referred to as $\tilde{\sigma}_{off}$, and the vector consisting of the median absolute deviation values will be referred to as $\tilde{\sigma}_{off}$. Said values are determined in the error statistics determination 38 so as to specify upper and lower bounds for the variation of the possible positions of the subimages in solving the optimization problem in step 36. In particular, 3 times the absolute median deviation is advantageously used as the boundary constraint. At 44, FIG. 6 shows by way of example the secondary limiting condition for the offset vectors which results from the distribution in FIG. 6 and will later be used in step 36. They are also shown in FIG. 5 by way of example, i.e. as an example for the example having an arrangement of 3×3 overlapping subimages.

For subimages $TB_1$ to $TB_N$ captured one after the other—specifically, one after the other in a specific scanning direction—, the following inequalities result for the upper and lower bounds for the differences of the capturing position variables:

$$p_{i+1} - p_i \leq t_{proj, i+1} + \tilde{\mu}_{off} + 3*\tilde{\sigma}_{off} \; i \in [1, N-1] \quad \text{Equation 5}$$

$$p_i - p_{i+1} \leq t_{proj, i+1} - \tilde{\mu}_{off} + 3*\tilde{\sigma}_{off} \; i \in [1, N-1] \quad \text{Equation 6}$$

wherein $\tilde{\mu}_{off}$ and $\tilde{\sigma}_{off}$ are dependent on the direction of the scan, as was described above. In the matrix notation, this results in the secondary non-equality constraint:

$$Cp \leq b., \quad \text{Equation 7}$$

which in turn is taken into account in solving the optimization problem in step 36, i.e. equation 3.

Thus, in particular, the weighted least squares equation system in accordance with equation 3 is solved in step 36 in that the secondary constraint from equation 7, which results from the error statistics as has been determined in step 38, is taken into account, which all in all results in the optimization problem to be solved in step 36:

$$\operatorname*{argmin}_{p}(t^T W^2 t - 2 t^T W^2 A p + p^T A^T W^2 A p) \quad \text{Equation 8}$$

under the secondary constraint $$Cp - b \leq 0.$$

The optimization problem of equation 8 represents a convex optimization problem having a quadratic function and a secondary non-equality constraint, i.e. a so-called quadratic program. Quadratic programmings may be solved while using the Karush-Kuhn-Tucker (KKT) theorem. The KKT theorem is essentially an extension of the Lagrange multipliers, as a result of which the secondary non-equality constraints are either active or inactive. Active means that a non-equality constraint actually restricts the solution and consequently is of the Lagrange type. An inactive secondary constraint, in turn, is a secondary constraint which does not restrict the solution and consequently does not impair the solution.

The result of the solution of the optimization problem in step 36 is thus a set of optimum capturing position variables $p_i$ which, together with the subimages $TB_i$ as were captured in step 30, yield a mosaic picture which, as is shown in FIG. 2, in a step 46 might optionally be combined with the aid of the determined or estimated capturing positions p, and a suitable interpolation or other fusion operation, to form an overall image defined in a regular global grid.

Now that an embodiment has been described above, a result or test result which has been obtained by means of the approach described above will be described below. Stitching and/or mosaicing algorithms are typically evaluated in visual terms only. Objective evaluation is a difficult task in particular in microscopy since no ground truth is available with which the stitched image may be compared. Therefore, a method may be used which is based on producing cervical synthetic virtual slides so as to obtain a ground truth about the positioning accuracy of the stitching algorithm [8]. For the purpose of producing such a synthetic slide, it is on several real-world slides that the distribution of the cells is analyzed and the average background color is measured. Subsequently, a scene is created wherein the average background color matches that which has been measured. Images of cervical cells and cervical cell clusters are distributed on this scene in accordance with the measured real-world distribution. This scene is then cut into 1000×1000 pixel fields of view, each of which exhibits an approximately 20% overlap with the neighboring images. To imitate the positioning accuracy of the stage, the cutting positions vary randomly around the projected cut. Each field is separately corrupted by additive white Gaussian noise. The fields may then be stitched using a mosaicing algorithm, and the resulting field-of-view positions of the fields of view can then be compared to the actual known cut positions.

For testing the above embodiment, this approach has been extended so as to better match the real circumstances in microscopy. The cut position was not only allowed to vary around the projected cut, but also, additional offsets were introduced which are based on the measured mean offsets for the three scanning directions of a real slide, as was described above. Since it had to be proven that the algorithm is specifically suited for slides having extended areas of low information content, it was additionally ensured that the overlap areas between adjacent fields of view randomly have a likelihood of 20% of being completely void of information content. Moreover, each field of view is shaded so as to simulate the brightness distribution existing in microscopy. For the purpose of shading, an image of an area on a slide without any information content was taken as a white reference image. The shading was achieved by inversing the two-point calibration scheme while using an empty black reference image, such as defined by Jähne [12]. The size of the synthesized slides used for evaluation was extended to 20×30 fields of view.

150 synthetic slides, each comprising 20×30 fields of view, were created. Said slides were stitched using the above algorithm. For the comparison, they were also evaluated while using the weighted least squares optimization presented in [8] above. Additionally, they were evaluated while using a standard least squares optimization as was introduced by [4] and while using a naïve consecutive stitching without optimization. For each field of view, the error metric is the relative Euclidean distance between the reference translation vector from each neighboring field of view and the translation vector resulting from the different stitching schemes.

Table 1 reproduces the results obtained by the evaluation and clearly shows that the method presented achieves the best results. At a first glance, the rather high mean error of 1.82 pixels does not seem to be a very promising result. However, one has to be aware that said results also include fields of view with empty overlap areas which cannot be placed with precision. Thus, the mean error of 0.82 pixels yields a better estimate of the positioning accuracy. In view of this, it is clear that the large majority of all fields of view were able to be placed with precision. The weighted least squares optimization scheme achieves good results with a mean positioning error of 0.822 pixels. However, if one takes into account that the mean value and the standard deviation are very much higher as compared to the scheme proposed, the stitched results are not as consistent. Said results clearly show that constraining the solution yields a more consistent mosaic. The poorer results obtained by the optimization while using standard least squares optimization stem from the characteristics of the method. A standard least squares optimization only distributes the error evenly over all of the equations and does not distinguish between good and poor matches. The naïve consecutive alignment without optimization shows the poor results expected.

Moreover, the above algorithm was visually tested on several real-world examples. Histology, cervical cell and blood smear slides were scanned and then stitched. A histological slide of artificially grown human skin tissue stitched with the present method was examined visually. Visual examination detected almost no offsets between neighboring fields of view. This shows that the proposed synthetic evaluation may yield a ground truth about the positioning accuracy of the stitching schemes under worst case assumptions. However, in real-world applications, neither is the shading so extreme, nor are there usually so many empty overlap areas. Thus, one should not consider the values as are presented in Table 1 to be absolute values, but rather to be a possibility of the ground truth comparison of different stitching schemes.

Table 1 represents positioning error results that were obtained by evaluating 150 synthetic slides of the size of 20×30 fields of view and of a likelihood of 20% of an empty overlap area. The error is indicated as a mean value $\mu_e$, standard deviation $\sigma_e$, median value $\tilde{\mu}_e$, minimum $\min_e$ [pixels] and maximum $\max_e$ of the Euclidean distance between the assumed translation vector from the neighboring fields of view and the translation vector calculated by stitching.

TABLE 1

| Algorithm | $\mu_e \pm \sigma_e$ [pixel] | $\tilde{\mu}_e$ [pixel] | $\min_e$ [pixel] | $\max_e$ [pixel] |
|---|---|---|---|---|
| Consecutive alignment | 208.679 ± 279.442 | 104.766 | 0.003 | 2620.28 |
| Least squares optimized stitching | 60.976 ± 48.521 | 47.789 | 0.100 | 424.102 |
| Weighted least squares optimized stitching | 4.111 ± 12.523 | 0.822 | 0.002 | 307.827 |
| Quadratic programming based optimization in accordance with the above embodiments | 1.820 ± 2.774 | 0.820 | 0.002 | 71.881 |

Thus, an advantageous algorithm for automatic stitching of microscopy images has been described. Said stitching was regarded as a parameter optimization problem which has been globally solved for all of the images in parallel. Non-equality constraints have been taken into account by applying an optimization technique which is able to deal with such constraints. It was possible to utilize the Karush-Kuhn-Tucker theorem of quadratic programming to solve the system of the equations. Quantitative evaluations were presented under realistic conditions which extend the method which uses synthetic images in order to provide the precise ground truth. Real-world images have been used, and the results have been evaluated. The results show visually and quantitatively that the above mosaicing algorithm provides highly accurate results.

The above embodiments thus describe mosaic picture generation concepts which might be used in virtual microscopy, i.e. for geometrically reconstructing an actual slide from many partial views or subimages. Modern microscopy systems, such as in the clinical field and as may also be used for the capturing device 12, for example, are indeed already corrected in most cases in terms of geometric distortions and disturbances, but a source of error still remains. Specifically, the dominant source of errors is mostly translational, i.e. the subimages are translationally offset in relation to one another if one were to arrange them in accordance with the capturing positions as are obtained from the capturing device 12. This is why in the preceding embodiments, the transform space was restricted to two offset vector parameters, i.e. the x component and the y component of an offset vector. However, the above embodiments may also be extended.

The aim of stitching, or of mosaicing, consists in registering each subimage, or each partial view, with the neighboring partial views in such a manner that almost no visible geometric disturbances remain. In this context, the above embodiments were subdivided into few steps. Initially, a first step comprised determining the transforms between each partial view and its direct neighbors. By way of example, in the preceding embodiments a determination was also made in terms of how good the respective match was at the offset vector determined. However, the latter might also be omitted in alternative embodiments, i.e. the matrix W might be the unit matrix, i.e. comprising only ones along the diagonal. A further step comprised utilizing the transform parameters thus determined in order to obtain an estimate of the positioning accuracy of the relative motion generator. This knowledge was used for statistically determining specific upper and lower bounds for the possible positions of the subimages. Finally, a weighted (or unweighted) equation system was formed while using the transform parameters from the first-mentioned step, which was subject to a non-equality constraint on the part of the parameters from the second step mentioned. The system may be transformed to a non-equality-constrained quadratic programming problem, such a system being solvable, in turn, by using the Karush-Kuhn-Tucker theorem.

In accordance with the above embodiments, the optimization problem was consequently not treated as being fully separate from the image capturing step. This provides the above-described improvements. Specifically, if the positioning accuracy of the relative motion generator 24 is analyzed, one can thus pay attention to the observation that the positioning varies only within a specific framework. This knowledge may be utilized, in accordance with the above embodiments, for rendering the optimization step more robust by specifying upper and lower bounds for the possible image repositioning processes in the mosaicing process and/or the process of solving the optimization problem. As was described above, the optimization problem may be solved while using a quadratic programming with non-equality constraints.

Thus, the above embodiments describe an approach to producing virtual slides, said approach encompassing or taking into account the positioning accuracy of the relative motion generation between the field of view of the objective/image sensor arrangement, on the one hand, and the object to be examined within the object plane, on the other hand, in the optimization step. In order to detect a complete slide in microscopy, a large number of fields of view may be captured, e.g. by moving a positioning table in a controlled manner. Said fields of view are aligned such that a globally consistent virtual slide is formed. Depending on the positioning repeatability of the positioning stage and on the accuracy of the positioning stage calibration, this will lead to alignment errors, however. Said errors are normally dissolved by applying a mosaicing algorithm. The above algorithms extend known mosaicing approaches by analyzing the positioning accuracy of the stage and by assimilating said knowledge in order to render the mosaicing process more stable.

In accordance with some of the above embodiments, even the quality of the determined transforms and/or offset vectors was measured, and thus, the equation system was weighted, and, additionally, the solution of the equation system with the above-mentioned secondary constraints was restricted. The secondary constraints resulted from the observation that the stage 24 performs erroneous positioning within a limited area only. It was possible to set up, from this observation, a secondary constraint which limits the possible displacement to this area.

Thus, the above embodiments are characterized in that the positioning accuracy of the relative motion generator is determined and that secondary constraints are set up. In the above embodiments, specific secondary constraints are set up for all of the three positioning directions of a mosaic-shaped capturing path, which, however, is only an example and need not be the case in all of the embodiments. In addition, in the above embodiments, a registration problem which represents a quadratic function with secondary constraints was posed and solved. The solution was determined by means of a quadratic program on the basis of the Karush-Kuhn-Tucker theorem.

The above embodiments may be utilized in many respects. Generally, virtual microscopy slides are exploited in a multitude of possible applications. For example, virtual microscopy slides, i.e. the results of the above mosaicing, may be utilized for digitization in microscopy and/or for producing a virtual microscopy slide, for generating overall views of a microscopy slide, for continuous zooming in a microscopy slide, i.e. for generating different magnification stages, for documentation purposes in that, e.g., regions of interest, such as regions utilized for diagnosis, are digitally annotated accordingly, for analyzing digital microscopy slides from a distance, such as via the internet, and for quality assurance, according to the principle: "Absolutely everything that has to be looked at has been looked at, and there are no omissions". Finally, the above embodiments and/or virtual microscopy slides which have been produced in accordance with the above embodiments may be used for the purpose that several persons may analyze the same region of interest, which provides a possibility of comparison for them.

Fields of application of the above embodiments thus are in medicine, such as in analyzing microscopic clinical samples. However, the above embodiments might also be employed in teaching, such as in classes for presenting biological samples or for examination purposes, so that, specifically, candidates to be examined may annotate digital samples so as to find degenerated cells there, for example. In technology, the above embodiments might be used for analysis, examination of components, documentation of defects on components or the like. For example, the above embodiments might be used in microelectronics, e.g. for analyzing semiconductor components such as chips. In biology and pharmaceutics, the above embodiments might be utilized for analyzing and documenting the effect of chemical/pharmacological substances on biological samples.

Among other things, the above embodiments describe an approach characterized by the following: registration and/or transform determination was determined between mutually adjoining fields of view by means of an inverse normalized cross power spectrum or other similarity measures. The transform determination was extended by means of the approach by Foroosh [3] or subpixel accuracy was created in this manner. Registration was performed only in the overlap area for reasons of computing power and performance. Determination of a quality level for the calculated transforms may be used for rendering outlier values in pairwise registration less harmful. Generation of an overdetermined linear equation system as a global optimization problem is common to the above embodiments. The linear equation system has been transferred to a weighted least squares problem. Weighting by means of the quality level can be used. Finally, the weighted least square problem may be resolved to become a quadratic function. The positioning accuracy of the stage and the calibration may be performed on the basis of the transforms calculated. The positioning accuracy serves to restrict the optimization problem by secondary non-equality constraints. The solution of the quadratic problems with secondary non-equality constraints may take place as a quadratic program on the basis of the Karush-Kuhn-Tucker theorem.

Even though some aspects have been described within the context of an apparatus, it is understood that said aspects also represent a description of the corresponding method, so that a block or a structural component of an apparatus is also to be understood as a corresponding method step or as a feature of a method step. By analogy therewith, aspects that have been described in connection with or as a method step also represent a description of a corresponding block or detail or feature of a corresponding apparatus. Some or all of the method steps may be performed by a hardware apparatus (or while using a hardware apparatus), such as a microprocessor, a programmable computer or an electronic circuit. In some embodiments, some or several of the most important method steps may be performed by such an apparatus.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic apparatus, configured or adapted to perform any of the methods described herein.

A further embodiment includes a computer on which the computer program for performing any of the methods described herein is installed.

A further embodiment in accordance with the invention includes an apparatus or a system configured to transmit a computer program for performing at least one of the methods described herein to a receiver. The transmission may be electronic or optical, for example. The receiver may be a computer, a mobile apparatus, a memory apparatus or a similar apparatus, for example. The apparatus or the system may include a file server for transmitting the computer program to the receiver, for example.

In some embodiments, a programmable logic apparatus (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware apparatus. Said hardware apparatus may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Bibliography

[1] F. Leong and J. McGee, "Automated complete slide digitization: a medium for simultaneous viewing by multiple pathologists," The Journal of Pathology, vol. 195, no. 4, pp. 508-514, 2001.

[2] K. Saeger, K. Schlüns, T. Schrader, and P. Hufnagl, "The virtual microscope for routine pathology based on a pacs system for 6 gb images," in International Congress Series, vol. 1256. Elsevier, 2003, pp. 299-304.

[3] R. Szeliski, Image Alignment and Stitching: A Tutorial. Now Publishers Inc, 2006.

[4] J. Davis, "Mosaics of scenes with moving objects," in Computer Vision and Pattern Recognition, 1998. Proceedings. 1998 IEEE Computer Society Conference on, 23-25 Jun. 1998, pp. 354-360.

[5] E.-Y. Kang, I. Cohen, and G. Medioni, "A graph-based global registration for 2d mosaics," in Proc. 15th International Conference on Pattern Recognition, I. Cohen, Ed., vol. 1, 2000, pp. 257-260 vol. 1.

[6] C. Sun, R. Beare, V. Hilsenstein, and P. Jackway, "Mosaicing of microscope images," in Proc. Digital Image Computing: Techniques and Applications DICTA '05, R. Beare, Ed., 2005, pp. 343-348.

[7] B. Appleton, A. Bradley, and M. Wildermoth, "Towards optimal image stitching for virtual microscopy," in Proc. Digital Image Computing: Techniques and Applications DICTA '05, A. Bradley, Ed., 2005, pp. 299-306.

[8] D. Steckhan, T. Bergen, T. Wittenberg, and S. Rupp, "Efficient large scale image stitching for virtual microscopy," in Proceedings of the 30th Annual International Conference of the IEEE EMBS, August 2008, pp. 4019-4023.

[9] D. Steckhan and T. Wittenberg, "Optimized graph-based mosaicing for virtual microscopy," in Medical Imaging 2009: Image Processing, vol. 7259, January 2009.

[10] H. Foroosh, J. Zerubia, and M. Berthod, "Extension of phase correlation to subpixel registration," IEEE Trans. Image Processing, vol. 11, no. 3, pp. 188-200, 2002.

[11] J. Proakis and M. Salehi, Digital Communications. McGraw-Hill New York, 1995.

[12] B. Jähne, Digital image processing: concepts, algorithms and scientific applications. Springer-Verlag London, UK, 1991.

[13] D. Wald, M. Reeff, G. Szkely, P. Cattin, and D. Paulus, "Fließende Üeberblendung von Endoskopiebildern für die Erstellung eines Mosaiks," in Bildverarbeitung für die Medizin 2005, H. P. Meinzer, H. Handels, A. Horsch, and T. Tolxdorff, Eds. Springer, Berlin, Heidelberg, New York, 3 2005, pp. 287-291. [Online]. Available: ftp://ftp.vision-.ee.ethz.ch/publications/proceeding s/eth biwi 00339.pdf

[14] Bacus, J. V. and J. W. Bacus: Verfahren und Gerät zur Erzeugung eines virtuellen Mikroskopieträgers, 1998. International Patent Application WO 1998/039728.

[15] Bacus, J. V. and J. W. Bacus: Method and aparatus of mechanical stage positioning in virtual microscopy image capture, 2006. International Patent Application WO 2006/023443 A2.

[16] Kuhn, H. and. Tucker: Nonlinear programming. ACM SIGMAP Bulletin, S. 6-18, 1982.

[17] Shirota, T.: Virtual Slide Generation Devices, 2008. United States Patent Application US 2008/0187208 A1.

[18] Zeineh, J. A. and R.-T. Dong: System and methods for stitching image blocks to create seamles magnified images of a microscope slide, 2006. United States Patent Application US 2006/0045388.

The invention clamed is:

1. An apparatus for generating a mosaic picture of an object plane, comprising:
   a capturing device for portion-by-portion capturing of the object plane at a two-dimensional distribution of capturing positions by sequentially moving to the capturing positions along a capturing path using a motor, so as to acquire subimages which represent pictures of portions of the object plane which overlap, while allocating the capturing positions to the subimages, the capturing positions allocated to the subimages deviate from actual capturing positions in accordance with inaccuracies of the motor; and
   a processor for determining offset vectors between pairs of overlapping subimages by a similarity analysis of the overlapping subimages and for solving an optimization problem for finding an optimum set of capturing position variables for the subimages for minimizing a measure of a deviation between the offset vectors of the pairs of overlapping subimages and differences of the capturing position variables of the pairs of overlapping subimages, while complying with a secondary constraint for the capturing position variables which depends on error statistics statistically describing a distribution of a deviation between offsets between pairs of capturing positions allocated to the subimages, to which the motor moves immediately following each other, and actual offsets between corresponding pairs of actual capturing positions,
   wherein the secondary constraint limits, in dependence on the error statistics, the difference of capturing position variables for pairs of subimages which immediately follow one another along the capturing path.

2. The apparatus as claimed in claim 1, wherein:
   the two-dimensional distribution of capturing positions are substantially regularly arranged in rows and columns, and the capturing path is a zigzag path sequentially cycling through the two-dimensional distribution in rows of capturing positions, with traversing the rows of capturing positions sequentially along an advance direction aligned to the columns of capturing positions and alternatingly along a respective one of a first direction, a second direction, and the advance direction, so that capturing positions of subimages which immediately follow one another in accordance with the zigzag path are located, in relation to one another, along a respective one of the first direction, the second direction, and the advance direction, the error statistics being discriminative for the first direction, the second direction, and the advance direction, and
   the secondary constraint for the differences of capturing position variables is different, in accordance with the error statistics, for pairs of subimages whose allocated capturing positions are located, in relation to one another, along the first direction, for pairs of subimages whose allocated capturing positions are located, in relation to one another, along the second direction, and for pairs of subimages whose allocated capturing positions are located, in relation to one another, along the advance direction.

3. The apparatus as claimed in claim 1, wherein the processor solves, as the optimization problem, the quadratic optimization problem $$\mathrm{argmin}_{p}(\|W(Ap - t)\|^2)$$

with the secondary constraint $$Cp \leq b,$$

wherein p is a vector with 2×N components which correspond to the capturing position variables of the N subimages in a pairwise manner;

t is a vector with 2×M components which correspond to the M offset vectors in a pairwise manner;

A is a matrix with 2×M rows and 2×N columns, each of the rows comprising 2×N−2 zeros and a one and a minus one at column positions in each case which correspond to the subimages between which that offset vector is determined which in the vector t corresponds to the component pair corresponding to the respective row;

W is a matrix with 2×M rows and 2×M columns;

C is a matrix with 2×N columns, each of the rows comprising 2×N−2 zeros and a one and a minus one at column positions in each case which correspond to the subimages which immediately follow each other along the capturing path; and b is a vector whose components depend on the error statistics.

4. The apparatus as claimed in claim 3, wherein W is a diagonal matrix whose diagonal components $W_{ii}$ in the respective row i of the matrix W correspond to a measure of a similarity of the subimages between which the offset vector at the corresponding component of the vector t is determined, in an overlap area of same as is defined by this very offset vector.

5. The apparatus as claimed in claim 1, wherein the processor determines the error statistics by computing statistical measures of a distribution of the deviation between the offset vectors of the pairs of overlapping subimages and differences of the capturing positions of the pairs of overlapping subimages.

6. The apparatus as claimed in claim 1, wherein the processor determines the error statistics by computing a central tendency and a dispersion of the deviations between the offset vectors of the pairs of overlapping subimages and differences of the capturing positions of the pairs of overlapping subimages.

7. The apparatus as claimed in claim 1, wherein the two-dimensional distribution of capturing positions essentially corresponds to a regular two-dimensional distribution in columns and rows.

8. The apparatus as claimed in claim 1, wherein the measure of the deviation is weighted with a measure of a similarity of the overlapping subareas for which the offset vectors are determined in each case.

9. The apparatus as claimed in claim 1, wherein the capturing device comprises:
an image sensor;
optical device for imaging a field-of-view portion of the object plane onto the image sensor;
the motor; and
a controller for controlling the motor and the image sensor, so that the object plane is captured at the two-dimensional distribution of capturing points; wherein
the motor effects a lateral relative motion between the object plane, and the image sensor and the optical device.

10. The apparatus as claimed in claim 9, wherein:
the controller:
dictates target capturing positions to the motor,
allocates the target capturing positions to the subimages as the capturing positions, and
instructs the image sensor, upon a confirmation signal for confirming that the target positions have been reached by the motor, to generate a respective subimage, and
the motor regulates a relative lateral location between the object plane, and the image sensor and the optical device, for such time until the target capturing positions have been reached, and to then send the confirmation signal to the controller in each case.

11. The apparatus as claimed in claim 9, wherein the optical device includes a microscope objective, and a relative motion generator includes the motor and a positioning table for displacing a slide which defines the object plane.

12. The apparatus as claimed in claim 9, wherein:
the controller:
dictates to the motor a capturing path,
instructs the image sensor at capturing times to generate a respective subimage, and
instructs the motor to detect a momentary relative location position which is allocated, as the capturing position, to the subimage generated at the respective capturing time, and
the motor changes the relative location position between the object plane and the image sensor and the optical device, in accordance with the capturing path and to detect the momentary relative location position upon the instruction from the controller.

13. A method of generating a mosaic picture of an object plane, comprising:

portion-by-portion capturing of the object plane at a two-dimensional distribution of capturing positions by sequentially moving to the capturing positions along a capturing path using a motor, so as to acquire subimages which represent pictures of portions of the object plane which overlap, while allocating the capturing positions to the subimages, the capturing positions allocated to the subimages deviate from actual capturing positions in accordance with inaccuracies of the motor; and
determining offset vectors between pairs of overlapping subimages by a similarity analysis of the overlapping subimages; and
solving an optimization problem for finding an optimum set of capturing position variables for the subimages for minimizing a measure of a deviation between the offset vectors of the pairs of overlapping subimages and differences of the capturing position variables of the pairs of overlapping subimages, while complying with a secondary constraint for the capturing position variables which depends on error statistics statistically describing a distribution of a deviation between offsets between pairs of capturing positions allocated to the subimages, to which the motor moves immediately following each other, and actual offsets between corresponding pairs of actual capturing positions,
wherein the portion-by-portion capturing is performed such that the secondary constraint limits, in dependence on the error statistics, the difference of capturing position variables for pairs of subimages which immediately follow one another along the capturing path.

14. A non-transitory computer readable medium including a computer program comprising a program code for performing, when the program runs on a computer, the method of generating a mosaic picture of an object plane, said method comprising:
portion-by-portion capturing of the object plane at a two-dimensional distribution of capturing positions by sequentially moving to the capturing positions along a capturing path using a motor, so as to acquire subimages which represent pictures of portions of the object plane which overlap, while allocating the capturing positions to the subimages, the capturing positions allocated to the subimages deviate from actual capturing positions in accordance with inaccuracies of the motor; and
determining offset vectors between pairs of overlapping subimages by a similarity analysis of the overlapping subimages; and
solving an optimization problem for finding an optimum set of capturing position variables for the subimages for minimizing a measure of a deviation between the offset vectors of the pairs of overlapping subimages and differences of the capturing position variables of the pairs of overlapping subimages, while complying with a secondary constraint for the capturing position variables which depends on error statistics statistically describing a distribution of a deviation between offsets between pairs of capturing positions allocated to the subimages, to which the motor moves immediately following each other, and actual offsets between corresponding pairs of actual capturing positions,
wherein the portion-by-portion capturing is performed such that the secondary constraint limits, in dependence on the error statistics, the difference of capturing position variables for pairs of subimages which immediately follow one another along the capturing path.

* * * * *